United States Patent
Retnakumari et al.

(10) Patent No.: US 9,547,536 B2
(45) Date of Patent: Jan. 17, 2017

(54) CONNECTION HANDLER AND METHOD FOR PROVIDING APPLICATIONS WITH HETEROGENEOUS CONNECTION OBJECTS

(75) Inventors: Sanju K. Retnakumari, Bangalore (IN); Shashwath Pangal, Mangalore (IN)

(73) Assignee: SOFTWARE AG, Darmstadt (DE)

( * ) Notice: Subject to any disclaimer, the term of this patent is extended or adjusted under 35 U.S.C. 154(b) by 1246 days.

(21) Appl. No.: 12/929,077

(22) Filed: Dec. 29, 2010

(65) Prior Publication Data

US 2011/0218981 A1    Sep. 8, 2011

(30) Foreign Application Priority Data

Mar. 3, 2010 (EP) .................................. 10155322

(51) Int. Cl.
   *G06F 17/30*    (2006.01)
   *G06F 9/54*     (2006.01)

(52) U.S. Cl.
   CPC ...................... *G06F 9/544* (2013.01)

(58) Field of Classification Search
   CPC ..................... G06F 17/30286; G06F 17/30067
   USPC ............................................. 707/609
   See application file for complete search history.

(56) References Cited

U.S. PATENT DOCUMENTS

| | | | |
|---|---|---|---|
| 7,222,179 B2 | 5/2007 | Srivastava et al. | |
| 2005/0172029 A1* | 8/2005 | Burke et al. | 709/232 |
| 2005/0268080 A1* | 12/2005 | Quang | G06F 17/3007 713/1 |
| 2006/0146877 A1* | 7/2006 | Srivastava | 370/469 |
| 2006/0146878 A1* | 7/2006 | Srivastava | G06F 9/5055 370/469 |
| 2006/0195571 A1* | 8/2006 | Srivastava et al. | 709/224 |
| 2007/0088826 A1* | 4/2007 | Raphel | H04L 47/10 709/225 |
| 2007/0130356 A1* | 6/2007 | Boucher et al. | 709/230 |
| 2007/0288924 A1* | 12/2007 | Srivastava | G06F 9/5061 718/100 |
| 2009/0064199 A1* | 3/2009 | Bidelis | G06F 9/5027 719/328 |
| 2011/0093937 A1* | 4/2011 | Mantle | G06F 21/6218 726/6 |

FOREIGN PATENT DOCUMENTS

| | | |
|---|---|---|
| CN | 101334778 | 12/2008 |
| CN | 101383814 | 3/2009 |

OTHER PUBLICATIONS http://download.oracle.com/docs/cd/E13222_01/wls/docs81b/ConsoleHelp/jdbc_multipo., JDBC Multipools, 3 pages.
European Search Report issued for European Patent Application No. 10155322.0, dated Dec. 7, 2010.

(Continued)

Primary Examiner — Tyler Torgrimson
(74) Attorney, Agent, or Firm — Nixon & Vanderhye P.C.

(57) ABSTRACT

A connection handler is provided on a computing system. The connection handler provides an application with heterogeneous connection objects. Heterogeneous internal connection pools provide homogeneous connection objects related to a specific configuration. Requests are received from the application where the request includes an identification of a specifically configured connection object. A connection object is provided to the application from a respective internal connection pool.

13 Claims, 4 Drawing Sheets

(56) References Cited

OTHER PUBLICATIONS

Figure 1:
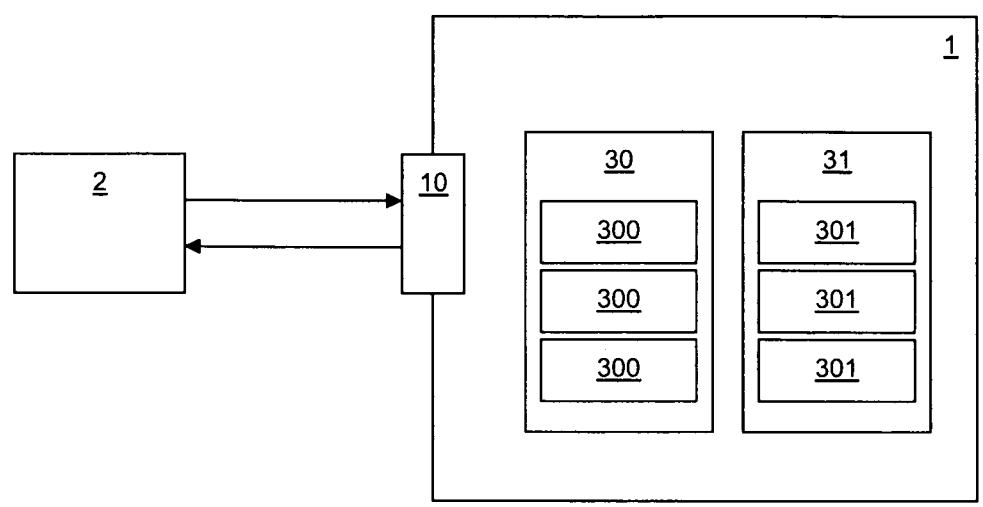

"WebMethods Adapter Development Kit 6.5 Release Notes," Software AG, Apr. 3, 2011.
"WebMethods Adapter Development Kit Installation Guide," Software AG, Version 6.5, Mar. 2009.

* cited by examiner

CONNECTION HANDLER AND METHOD FOR PROVIDING APPLICATIONS WITH HETEROGENEOUS CONNECTION OBJECTS

This application claims priority to European Application No. 10155322.0, filed 3 Mar. 2010, the entire contents of which is hereby incorporated by reference.

1. TECHNICAL FIELD

The present invention relates to a connection handler and a method for providing applications with heterogeneous connection objects.

2. THE PRIOR ART

Modern software applications typically communicate with a variety of external data stores, such as databases, in order to retrieve data to be processed and to store processed data. To this end, the application has to establish a connection to the respective data store, which involves opening the connection, retrieving and/or storing data and eventually closing the connection. However, establishing a connection by the application itself each time such a connection is needed is very time-intensive and consumes considerable processing power of both the application and the data store to be connected, which leads to performance degradations.

To this end, it is known to provide a connection pool that comprises a set of preconfigured individual connections to a given data store. Typically, the attributes of the connections provided by the connection pool are statically predefined during configuration of the connection pool and the configuration cannot be changed later, at runtime. An application can request a connection from the connection pool and returns the connection to the pool after it has finished its processing. The connection pool may keep the returned connection in order for it to be reused by further applications. Therefore, a connection pool hides the complexities involved in creating and managing the connections.

However, the known connection pool implementations are designed for maintaining only homogeneous connections, i.e. all connections within a given connection pool have the same configuration/attributes, which is defined during the configuration of the pool. In a connection pool for a JDBC database, for example, all connections would point to the same database server, schema, username and password.

In this context, the U.S. Pat. No. 7,222,179 B2 discloses a resource pool that manages the creation of resource objects as well as pool shrinking, i.e. the destroying of unused resource objects. However, the disclosed resource pool conforms to the above-explained concept of a connection pool, so that the resource pool is only able to provide homogeneous resources to clients.

Furthermore, the US 2006/0146877 A1, the US 2006/0146878 A1 and the related internet citation "JDBC Multi-Pools" (cf. http://download.oracle.com/docs/cd/E13222_01/wls/docs81b/ConsoleHelp/jdbc_multipools.html) disclose a multipool manager that maintains multiple connection pools, each being directed to a particular instance (i.e. a clone) of a given database. All connections served by the multipool manager are homogeneous, i.e. they serve only for connecting to the same physical database, while the multipool manager is concerned about load-balancing requests among the homogeneous connection pools.

The above approaches are especially disadvantageous in complex application scenarios where applications need connections to different data stores, i.e. connections with different configurations, e.g. based on runtime values, i.e. based on values that can only be determined during runtime of the application (heterogeneous connections). In a message queue connection, for example, the queue name to retrieve a message might be different for specific users that cannot be determined before the application is actually running.

In order to overcome the above disadvantage, applications are typically programmed to use a connection pool where necessary, but to create additional connections themselves, if they require differently configured connections than the ones provided by the connection pool, thereby actually bypassing the connection pool. This approach, however, besides being difficult to implement and prone to errors, has the additional disadvantage that the manually created connections cannot benefit from the advantages provided by the connection pool. This results in additional overhead in terms of resource and processing time usage within the application.

Another known workaround is to manually cache a once established connection within the application itself in order to reuse it by the application at a later point in time. However, this approach is highly inefficient and complex, since the application would basically have to take over all tasks supposed to be performed by a connection pool, such as creating and destroying connections, removing invalid connections, handling timeouts and expiry, handling exceptions and cleanup and notifying other associated connections on events such as pool refreshes.

A third known approach is to configure a number of connection pools, in case the configurations of the later needed connections are known in advance. However, the handling of more than one different connection pool by an application is extremely time and resource intensive and thus not acceptable.

Lastly, one connection pool could be used by an application for retrieving all connections, wherein the application changes the configuration of a retrieved homogeneous connection as desired and resets the configuration before the connection is returned to the pool. Obviously, this can only be done for very simple configurations that can be changed after the creation of the connection and is not applicable to complex application scenarios.

It is therefore the technical problem underlying the present invention to provide an improved way of providing an application with a connection that is more efficient and less error prone, thereby at least partly overcoming the above explained disadvantages of the prior art.

3. SUMMARY OF THE INVENTION

This problem is according to one aspect of the invention solved by a connection handler for providing at least one application with at least one of a plurality of heterogeneous connection objects. In the embodiment of claim 1, the connection handler comprises:

a. one or more heterogeneous internal connection pools, wherein each internal connection pool is adapted for providing homogeneous connection objects of a specific configuration other than those of the other internal connection pools; and b. an interface adapted for receiving at least one request from the at least one application, wherein the at least one request comprises an identification of a specifically configured connection object, and wherein the interface is further adapted for providing the at least one application in response with a connection object from the respective internal connection pool.

Accordingly, the embodiment defines a connection handler that encapsulates and internally manages specifically configured connection objects within internal connection pools and is further adapted for providing applications with connection objects upon request. A connection object is generally related to a data store, such as a database or any other component that an application intends to use and serves as a handle to this data store. Once an application is provided with a connection object, the application may access the respective data store via the connection object.

In the above embodiment, each internal connection pool within the connection handler may comprise any number of connection objects of a specific configuration. All connection objects within one specific internal connection pool are homogeneous, i.e. they all have the same configuration, so that as a result, different internal connection pools within the connection handler may group differently configured sets of homogeneous connection objects. The one or more internal connection pools are heterogeneous, i.e. each internal connection pool comprises connection objects with a configuration different from those of the other connection pools in order to serve connection objects suitable for different data stores (e.g. different physical databases having different database URLs, usernames, passwords or the like) to the at least one application.

The connection handler further comprises an interface adapted for communication with applications. The interface is adapted for receiving requests for specifically configured connection objects from the applications. To this end, a request received at the interface comprises in this embodiment an identification of a specifically configured connection object, e.g. in the form of one or more parameters comprised in the request. Thus, the application is able to identify within its request to the connection handler the properties of the desired connection object, i.e. the application is able to specify a desired specific configuration for the connection object to be obtained from the connection handler. The connection handler is then adapted for providing the application, via its interface, with a suitable connection object (i.e. a connection object that satisfies the requested configuration, i.e. that has the requested properties) from the respective internal connection pool. Since the connection pools are internal to the connection handler, i.e. encapsulated therein and since the application communicates with the connection handler only via its interface, the application does not have to have knowledge of and preferably cannot directly access the individual internal connection pools of the connection handler.

As a result, an application is for the first time enabled for obtaining a specifically configured connection object without having to care about the amount, structure, configuration, etc. of one or more connection pools. This greatly decreases the efforts needed for an application to obtain specifically configured connection objects, which leads to increased efficiency as well as simpler and therefore safer code within the applications. On the other hand, since the individual connection objects are comprised internally within the connection handler, the connection handler is able to manage the connection objects in a centralized manner which improves the overall resource usage of the connection pools, their comprised connection objects as well as the connected data stores.

In a further aspect, the connection handler may be adapted for creating during runtime a new internal connection pool specific to the at least one request, depending on an evaluation whether the connection handler already comprises a respective internal connection pool, wherein the connection handler may be further adapted for keeping the created internal connection pool after the at least one request has been processed. Accordingly, if the connection handler does not already comprise an internal connection pool with connection objects that match the request (i.e. there is no internal connection pool with connection objects whose configuration matches the desired configuration specified within the request of the application), the connection handler may create during runtime a new suitable internal connection pool. In other words, the connection handler is able to satisfy requests for connection objects with configurations that were a priori unknown, at the time the connection handler has been configured. As a result, the connection handler dynamically adapts during runtime to the needs of the requesting applications. Additionally, once a new internal connection pool has been created and a corresponding connection object has been delivered to the requesting application, the connection handler is able to keep the internal connection pool, so that future requests from the same or another application for connection objects corresponding to the newly created internal connection pool can immediately be processed. The creation of the new internal connection pool may additionally or alternatively depend on an evaluation of the amount of connection objects currently in use in all existing internal connection pools and/or on an evaluation of the total amount of connection objects comprised in all existing internal connection pools.

In yet another aspect of the present invention, the connection handler may be further adapted for removing one or more of the existing connection objects from the one or more internal connection pool during runtime. This further improves the dynamic nature of the connection handler and reduces the resource usage, since the connection handler can not only create new internal connection objects and pools as needed during runtime, but is also able to dynamically remove certain connection objects during runtime, e.g. in order to free processing and storage resources. The removing of one or more of the existing connection objects may comprise removing the least recently used, the most recently used, the least frequently used and/or the least frequently recently used connection object(s), as will be further explained in the detailed description below. Moreover, the removing of one or more of the existing connection objects may further depend on an evaluation of the total amount of connection objects comprised in all existing internal connection pools.

In another aspect, the evaluation of the total amount of connection objects comprised in all existing internal connection pools may comprise evaluating whether the total amount of connection objects comprised in all existing internal connection pools exceeds a predefined threshold defined during configuration of the connection handler. Alternatively, the predefined threshold may be defined and/or changed during runtime of the connection handler in order to adapt it e.g. to an increased amount of requests by applications. Consequently, since the pre-defined threshold applies to all internal connection pools, the connection handler is able to manage the different internal connection pools in a centralized manner according to a global configuration.

Additionally or alternatively, the interface of the connection handler may be further adapted for receiving at least one second request from the at least one application, wherein the at least one second request does not comprise an identification of a specifically configured connection object, and wherein the interface is further adapted for providing the at least one application with a connection object from a pre-configured internal connection pool. Accordingly, in contrast to the at least one first request that specifically identifies a desired connection object with a certain configuration, the at least one second request does not comprise such information, i.e. it is a request for a connection object without specifying which configuration of a connection object is desired by the at least one application. This has the advantage that existing applications that are programmed for accessing a prior art connection pool can also use the inventive connection handler without having to adapt their code. Consequently, the connection handler of the present invention is downward-compatible to known connection pools.

In another aspect of the present invention, the connection objects in each internal connection pool may be configured with a set of connection properties and wherein the at least one request received at the interface comprises a requested set of connection properties. Accordingly, a specific configuration of a connection object within the internal connection pools of the connection handler may comprise any information needed to configure the respective connection object for the respective data store it connects. The configuration properties may e.g. comprise information such as a database name, a username and/or a password. In this aspect, also the at least one request from the at least one application may directly, specify a requested set of connection properties, e.g. a requested database name, username and/or password. Accordingly, the connection handler may select a respective internal connection pool whose connection objects have a configuration that matches the requested set of connection properties. Alternatively, the at least one request may comprise only a subset of requested connection properties, e.g. only a database address and database name, but not a username and password. In this case, the connection handler may fill in pre-defined default values for the connection properties that are unspecified in the at least one request (the username and password in this example). The connection handler may then select a connection object from any internal connection pool that is configured with the respective properties.

Furthermore, the connection objects in each internal connection pool may be configured with a set of connection properties and the connection handler may be adapted for storing one or more aliases comprising a predefined set of connection properties, wherein the at least one request received at the interface comprises one of the aliases. Accordingly, the at least one request comprises in this aspect not a specific set of connection properties, but only an alias name, which is a reference to a predefined set of connection properties that is preferably predefined during configuration of the connection handler. This has the advantage that the at least one application does not have to know the exact connection properties, but only has to know the alias name in order to obtain a suitable connection object.

In yet another aspect of the present invention, the connection handler may be adapted for storing information concerning related internal connection pools, wherein a refreshing of one of the internal connection pools involves refreshing all related internal connection pools. Accordingly connection groups can be defined within the connection handler that group related connection pools. In certain scenarios, it might be necessary to refresh a given connection pool, i.e. to destroy all or part of the comprised connection objects and to create the connection objects anew, e.g. if the connected data store returns a connection error. In this case, if a given internal connection pool is refreshed, the connection handler is able to determine related further internal connection pools based on the defined connection groups and to also refresh those related connection pools. Each internal connection pool may be configured with a set of connection properties comprising key/value pairs and wherein the information concerning related internal connection pools comprises a subset of the keys, as will be further explained in the detailed description below.

The present invention also concerns a method for providing at least one application with at least one of a plurality of heterogeneous connection objects using any of the connection handlers described above. Lastly, a computer program is provided comprising instructions for implementing the method.

4. SHORT DESCRIPTION OF THE DRAWINGS

In the following detailed description, presently preferred embodiments of the invention are further described with reference to the following figures:

FIG. 1: A schematic block diagram of a connection handler according to an embodiment of the present invention; and FIGS. 2-4: Flowcharts of the tasks performed by a connection handler according to an embodiment of the present invention.

5. DETAILED DESCRIPTION

In the following, a presently preferred embodiment of the invention is described with respect to a connection handler 1 as schematically shown in FIG. 1. As can be seen, the connection handler 1 comprises two exemplary internal connection pools 30 and 31, wherein connection pool 30 comprises three exemplary connection objects 300 and connection pool 31 comprises three exemplary connection objects 301. Thus, the connection objects within a particular connection pool are homogeneous, while the connection pools are heterogeneous (i.e. each connection pools comprises connection objects different from the other connection pools). It should be noted that FIG. 1 only shows a very simple example and that the connection handler 1 may comprise any number of internal connection pools 30, 31 and connection objects 300, 301 that may be created and removed dynamically during runtime. The connection handler 1 further comprises an interface 10 for communication with an exemplary application 2, e.g. a Java application. While the connection handler 1 is generally able to communicate via the interface 10 with any number of applications 2, the interface 10 is preferably the only communication point between the application(s) 2 and the connection handler 1.

In the following, an interface of a single connection pool, such as one of the internal connection pools 30, 31, will be described in connection with the following interface definition:

```
public interface ConnectionPool {
    public Connection getConnection( );
    public void releaseConnection(Connection conn);
    int getMaxConnections( );
    int getMinConnections( );
    int size( );
}
```

As can be seen, the operation getConnection( ) is adapted for retrieving a connection object from the connection pool. If there are no free connection objects, i.e. all connection objects within the connection pool are currently used, and if the current size of the connection pool is less than the maximum number of allowed connections, a new connection object may be created. Else, if the maximum size of the connection pool is reached, an exception may be thrown or the caller may be forced to wait for a predefined amount of time.

It should be noted that the above operation getConnection( ) of the interface of the single connection pool does not accept any input parameters, since the connection pool stores only homogeneous connection objects. Consequently, the caller of the getConnection( ) operation cannot request a specifically configured connection object, but has to accept the connection object that is provided by the connection pool as a response to the call. Thus, the single connection pool is adapted for providing the caller only with preconfigured connection objects, wherein the configuration is predefined by the connection pool. The operation releaseConnection (Connection conn) may be used for notifying the connection pool that the connection object identified by the parameter 'conn' is released, i.e. that it is no longer used by the caller. The identified connection object may then be freed by the connection pool and may be later reused. The operation getMaxConnections( ) is adapted for returning the maximum number of connection objects that are allowed to be present within the connection pool at any point in time. This number is specified during the configuration of the single connection pool and is specific to this connection pool. Similarly, the operation getMinConnections( ) is adapted for returning the minimum number of connection objects that are held in the connection pool. The operation size( ) is adapted for returning the number of connection objects currently located within the particular connection pool. A connection pool may comprise further operations depending on the specific implementation. When a connection pool is initialized, it may immediately create a minimum number of connection objects, as specified by the getMinConnections( ) operation, i.e. before the first request is received.

In the following, the interface 10 of the connection handler 1 according to an embodiment of the present invention is explained in connection with the following exemplary interface specification:

```
public interface ConnectionHandler {
    public Connection getConnection(Map attributes);
    int getMaxConnectionsPerGroup( );
    int getMinConnectionsPerGroup( );
    public void releaseConnection(Connection conn);
}
```

As can be seen, the operation getConnection(Map attributes) of the connection handler 1 accepts an input parameter 'attributes' that serves for identifying a specifically configured connection object 300, 301 upon request. The operation may then return a connection object 300, 301 that matches the request, i.e. a connection object 300, 301 that is configured as desired by the caller. In the above example, the input parameter is in the form of a Map comprising key/value pairs. An application 2 may call the operation getConnection(Map attributes) in a request to the connection handler 1, wherein the request may comprise concrete attribute values for the attribute keys in order to obtain a specifically configured connection object 300, 301. In some embodiments, at least some, preferably all, of the keys may be predefined and specific for the implementation of the connection handler 1. For example, in an exemplary implementation of the connection handler 1 that serves for providing JDBC connection objects 300, 301, the keys may be defined as the server IP address, the server port and/or the database name. Alternatively, the connection properties, i.e. the key/value pairs provided by the application 2 in its request may be arbitrary and fully determined by the application 2.

Furthermore, the operation getMaxConnectionsPerGroup( ) may be adapted for returning the maximum number of connection objects 300, 301 that can be created for a group (i.e. connection objects 300, 301 with the same attribute values). Similarly, the operation getMinConnectionsPerGroup( ) may be adapted for returning the minimum number of connection objects 300, 301 that are maintained for a group (i.e. for connection objects 300, 301 with the same attribute values). Preferably, these two operations, i.e. the maximum and minimum number thresholds, are defined once within the connection handler 1 and apply to each individual internal connection pool 30, 31, so that all internal connection pools 30, 31 can be administered according to a global configuration.

Moreover, the interface 10 may further comprise an operation getConnection( ) that does not accept any input parameters (not depicted in the above interface specification). If this operation is called in a request from an application 2, the operation may return a connection object 300, 301 according to a default configuration, preferably from a default preconfigured internal connection pool 30, 31. The same may apply if the operation getConnection(Map attributes) is called with no attributes provided and/or with empty attribute values.

Lastly, the above interface specification shows a releaseConnection(Connection conn) operation, which serves to remove a particular existing connection object 300, 301 (i.e. the connection object indicated by the input parameter conn) from the respective connection pool 30, 31.

In the following, the internal functionality of the connection handler 1 of the present invention is described in more detail. As already explained further above, the connection handler 1 comprises one or more internal heterogeneous connection pools 30, 31 and can therefore be understood as creating and maintaining a pool of heterogeneous connection pools, wherein the connection objects inside each pool are homogeneous. Preferably, one of the connection pools 30, 31 comprises connection objects 300, 301 of a default configuration, which can be obtained by applications 2 by calling the getConnection( ) operation (without input parameters) of the interface 10 of the connection handler 1. On the other hand, when the interface receives a request for a specifically configured connection object 300, 301 (e.g. via the operation getConnection(Map attributes)), the connection handler 1 will serve this request from one of the further internal connection pools 30, 31. If there is no internal connection pool 30, 31 comprising a suitable connection object 300, 301, the connection handler 1 may create a new internal connection pool 30, 31 adapted for providing connection objects 300, 301 of the requested configuration. However, the internal creation of additional internal connection pools 30, 31 is hidden from the calling application(s) 2.

Each of the internal connection pools 30, 31 may be dynamically configured during runtime according to configuration parameters. In one embodiment, the connection pool configuration parameters may be defined once within the connection handler 1 and apply to all internal connection pools 30, 31 in order to achieve a global configuration of all internal pools. The following lists exemplary connection pool configuration parameters:

Maximum connections per group: This parameter specifies the maximum amount of connection objects 300, 301 that may be created for a group (i.e. connection objects 300, 301 with the same configuration) and determines the maximum amount of connection objects 300, 301 that can be created within one internal connection pool 30, 31. This parameter is exemplarily called MAX_SIZE_PER_GRP in the flowchart of FIG. 4.

Minimum connections per group: This parameter specifies the minimum amount of connection objects 300, 301 that are maintained in each internal connection pool 30, 31. This parameter is exemplarily called MIN_SIZE_PER_GRP in the following. In a preferred embodiment, the minimum number of connection objects 300, 301 is not created initially at the time the connection handler 1 is initialized, since the configurations of the connection objects 300, 301 are typically not known at that point in time. On the contrary, it is the applications 2 that determine via their requests which specifically configured connection objects 300, 301 and corresponding internal connection pools 30, 31 are created during runtime by the connection handler 1.

Furthermore, the connection handler 1 may comprise the further global configuration parameters:

Maximum pool size: This parameter specifies the maximum amount of connection objects 300, 301 that can be created in the entire connection handler 1, i.e. in all internal connection pools 30, 31. This parameter is exemplarily called MAX_POOL_SIZE in the flowcharts of FIGS. 3 and 4. Once this threshold is exceeded, the connection handler 1 may remove one or more of the existing internal connection pools 30, 31 and/or connection objects 300, 301, as will be explained in more detail further below.

Figure 3:
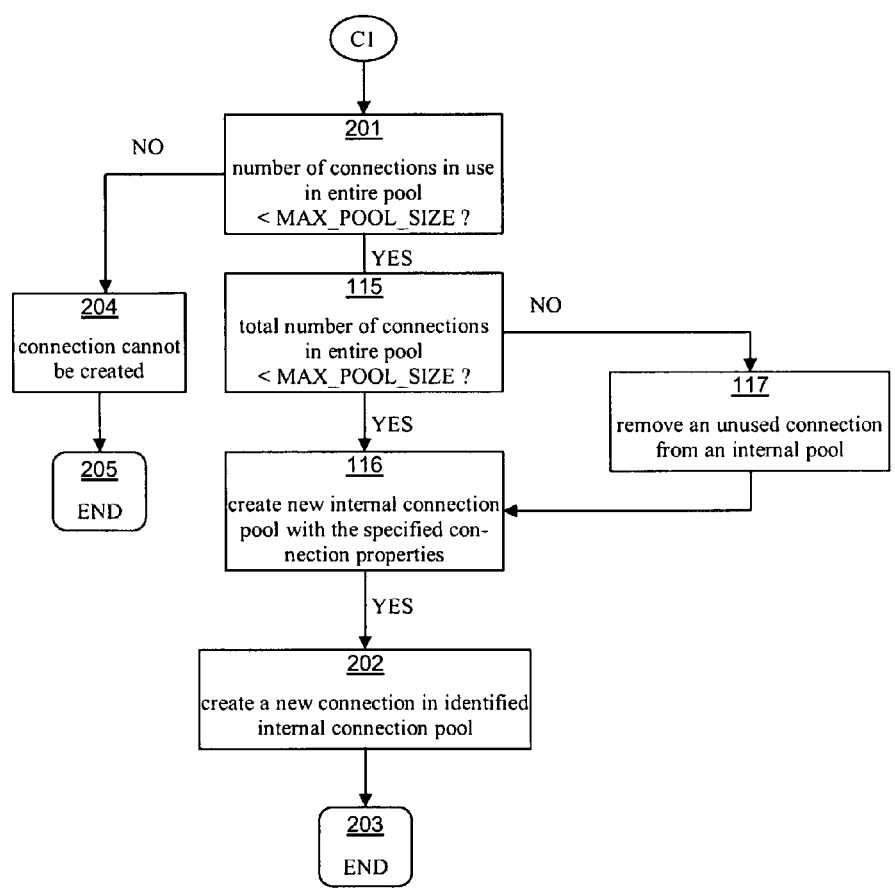
Figure 4:
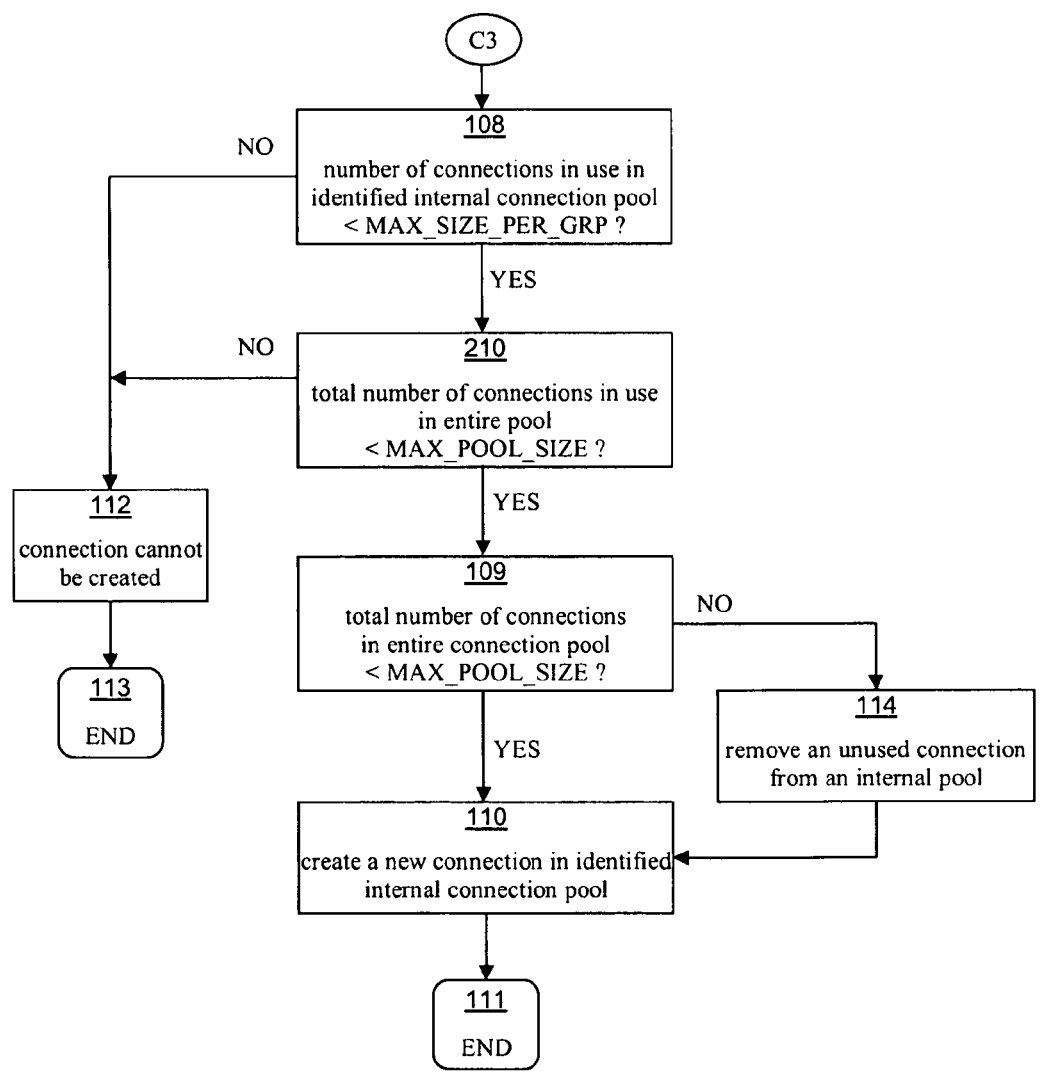

In the following, various advantageous features of the connection handler 1 will be described in more detail with reference to the flow charts of FIGS. 2-4. It will be appreciated that various embodiments of connection handlers 1 that only support some of the below-presented features may be provided, while still achieving their respective advantages.

Figure 2:
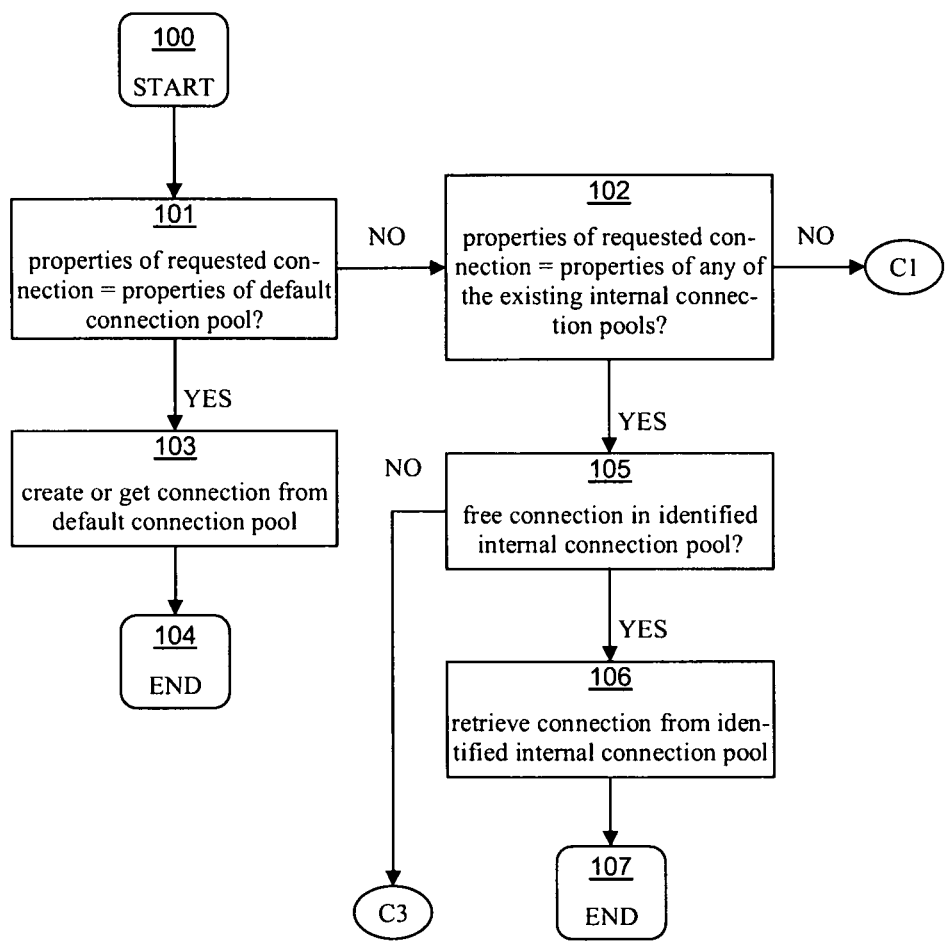

FIG. 2 shows the processing performed by the connection handler 1 upon receiving a request from an application 2. The processing starts in step 100 and proceeds to the decision step 101.

In step 101, it is determined whether the request is for a specifically configured connection object 300, 301 or not, i.e. whether a connection object 300, 301 is to be provided from a default internal connection pool 30, 31 or from an internal connection pool 30, 31 of a specific configuration. In one embodiment, when the operation getConnection( ) without input parameters is called, the default internal connection pool 30, 31 is used. The same applies, if the operation getConnection(Map attributes) is called without providing values for the attributes and/or if the provided attributes equal the attributes of the default internal connection pool 30, 31.

If this is the case, a connection object 300, 301 is in step 103 retrieved from the default internal connection pool 30, 31 and returned to the calling application 2 at step 104. If no connection object 300, 301 is present in the default internal connection pool 30, 31, a connection object 300, 301 is created in step 103 before being delivered to the requesting application 2 at step 104.

If it is determined in step 101 that the request is a request for a specifically configured connection object 300, 301, the connection handler 1 proceeds to decision step 102 and determines, whether an internal connection pool 30, 31 already exists that is suitable for satisfying the request (e.g. by comparing the requested set of connection properties with the sets of connection properties of the existing internal connection pools 30, 31).

If a suitable internal connection pool 30, 31 is identified in step 102, the connection handler 1 proceeds to step 105 and determines whether the respective identified internal connection pool 30, 31 has any free connection objects 300, 301 (i.e. if there is already a connection object 300, 301 present that is currently not used). If yes, the respective connection object 300, 301 is retrieved in step 106 and provided to the calling application 2 at step 107.

If no free connection object 300, 301 is identified in step 105, the connection handler 1 proceeds to step 108 (cf. FIG. 4) and determines whether the number of connection objects 300, 301 in use currently present within the identified internal connection pool 30, 31 is less than the maximum number of allowable connection objects 300, 301 per group (cf. the parameter MAX_SIZE_PER_GPR explained above). If not, the connection object 300, 301 cannot be created (step 112) and the processing ends in step 113. Generally, the connection handler 1 may to this end distinguish between already created connection objects 300, 301 that are currently in use (i.e. used by an application 2 to connect to a certain data store) or are currently unused (i.e. an application 2 has finished using the connection object and returned it to the connection handler 1).

Otherwise, decision step 210 determines whether the total number of connection objects 300, 301 in use currently present in the entire connection handler 1 is less than the maximum number of allowable connection objects 300, 301 in the entire connection handler 1, i.e. in all its internal connection pools 30, 31 (cf. the parameter MAX_POOL_SIZE explained above). If not, the connection object 300, 301 cannot be created (step 112) and the processing ends in step 113.

Otherwise, decision step 109 determines whether the total number of connection objects 300, 301 (i.e. the number if connection objects that are either free or in use) currently present in the entire connection handler 1 is less than the maximum number of allowable connection objects 300, 301 in the entire connection handler 1, i.e. in all its internal connection pools 30, 31 (cf. the parameter MAX_POOL_SIZE explained above). If yes, the connection handler 1 creates in step 110 a new connection object 300, 301 in the identified internal connection pool 30, 31 and provides the newly created connection object 300, 301 to the calling application 2 in step 111.

If not, the connection handler 1 may in step 114 remove one of the existing connection objects 300, 301 from an internal pool 30, 31 (see further below) and subsequently proceed to step 110.

If the evaluation in step 102 (cf. FIG. 2) determines that there exists no internal connection pool 30, 31 suitable for processing the request, the connection handler proceeds to step 201 (cf. FIG. 3) and determines whether the total number of connection objects 300, 301 in use is less than the allowed maximum (cf. the parameter MAX_POOL_SIZE explained above). If not, the connection object 300, 301 cannot be created (step 204) and the processing ends in step 205.

Otherwise, the connection handler proceeds to step 115 (cf. FIG. 3) and determines whether the total number of connection objects (both in use and free) 300, 301 is less than the allowed maximum (cf. the parameter MAX_POOL_SIZE explained above). If yes, the connection handler 1 creates in step 116 a new internal connection pool 30, 31 specific for the request, i.e. a new internal connection pool 30, 31 that is adapted for providing connection objects 300, 301 that satisfy the request. Afterwards, the connection handler 1 creates in step 202 a new connection object 300, 301 in the identified internal connection pool 30, 31 and provides the newly created connection object 300, 301 to the calling application 2 in step 203.

If the evaluation in step 115 determines that the total number of connection objects 300, 301 present in the entire connection handler 1 already equals the allowed threshold (cf. the parameter MAX_POOL_SIZE explained above), the connection handler 1 may remove in step 117 one of the existing connection objects 300, 301 from an internal connection pool 30, 31 and subsequently proceed to step 116.

In the following, advantageous variations of strategies for removing 114, 117 a connection object 300, 301 from an internal connection pool 30, 31 will be described. It will be appreciated that further strategies may be employed depending on the application use case. Furthermore, if the conditions that affect the reuse of connection objects 300, 301 are known in advance, the connection handler 1 may be implemented with a suitable predefined removal strategy. Otherwise, if e.g. the connection handler 1 is to be employed on an application server adapted for connecting to a variety of different data stores, a suitable removal strategy may be selected by an administrator during runtime and/or connection handler configuration time. The following are examples for removal strategies:

Least recently used (LRU): According to this strategy, the connection objects 300, 301 which have not been processed in a certain period of time are removed. The time period may be determined by a suitable configuration parameter of the connection handler 1. This strategy is especially advantageous, if the applications 2 typically re-use connection objects 300, 301 that they have recently used.

Most recently used (MRU): According to this strategy, the connection objects 300, 301 that are most recently used are removed first. This strategy is especially advantageous in scenarios where most of the recently accessed connection objects 300, 301 are not often re-used in the near future, but where the older a connection is the more likely it is to be accessed.

Least frequently used (LFU): According to this strategy, the connection objects 300, 301 are removed that have been used the least amount of times. In this strategy, the connection handler 1 may maintain one or more counters to determine how often the individual connection objects 300, 301 are requested. This strategy is especially advantageous, if some connection objects 300, 301 are more frequently used than others, so that the counters may be used as an indication of the probability of a connection object 300, 301 being re-used in the future. A further variant of this strategy is 'aging LFU', which takes recent uses more heavily into account than older uses.

Least frequently recently used (LFRU): This strategy removes connection objects 300, 301 that are the least frequently used and not recently used, thereby combining the LRU and LFU strategies, which may lead to improved performance.

In the following, exemplary application scenarios will be described, in which the connection handler 1 of the present invention is particularly advantageous. For example, an application 2 may be designed to employ a messaging mechanism, such as MQ messages, for processing request messages from a plurality of different users of the application 2. After processing a message, the application 2 is supposed to send a corresponding response message to the requesting user. In this example, all users insert their request messages into a predefined request queue that is known to the application 2 during configuration time. A corresponding response queue for the response messages, however, will be specific for each user of the application 2 and is preferably running in the user environment. Therefore, the response queues are unknown to the application 2 at the time of configuration and therefore also unknown to a connection handler 1 that the application 2 intends to use. The response queue attributes, such as queue server address, port, queue manager name, queue name and/or channel name, will not be known until the calling users specify these attributes in their request messages, i.e. at runtime. Consequently, the application 2 needs to employ different connection objects for different user requests, which is achieved by the advantageous features of the connection handler 1 described above.

In another related application scenario, an application 2 intends to post data for the users to corresponding tables of a user database. The database connection properties, such as server address, port, schema name, user and/or password, however, will be different for each user and therefore the application 2 needs to employ different connection objects with different configurations, i.e. connection properties, for each user. Also here, the application 2 can advantageously achieve this task by employing a connection handler 1 of the present invention.

In some embodiments, the connection handler 1 may additionally or alternatively have the capability to associate the configurations of the internal connection pools 30, 31, e.g. the related connection properties, with groups. Accordingly, during configuration of the connection handler 1, it can be specified which connection parameters are part of a so-called connection group. In the following, an example is presented using a pool refresh feature for a connection handler 1 configured for JDBC connection objects. Typically, a connection pool is refreshed (i.e. all connection objects within the pool are destroyed and created anew), if any connection failure occurs while creating the connections or while executing transactions. Exemplary causes for connection failures may be network failure or database unavailability.

In the example, the connection properties, i.e. the specific configurations of the internal connection pools 30, 31 of the connection handler 1 comprise the properties database server address (SERVER_IP), database server port (PORT), database name (DATABASE_NAME), user name (USER) and password (PASSWORD). In this example, a connection group may be defined as comprising only the properties SERVER_IP, PORT and DATABASE_NAME, i.e. as a subset of the above connection properties. If the connection handler 1 needs to refresh its internal connection pools 30, 31, only the internal connection pools 30, 31 with connection objects 300, 301 with the same values for SERVER_IP, PORT and DATABASE_NAME need to be refreshed, since they are connecting to the same physical database server.

Note that USER and PASSWORD are not comprised in the exemplary connection group, since even when the USER property of two connection objects 300, 301 (located within distinct internal connection pools 30, 31) is different, but if they both connect to the same database server, both connection objects 300, 301 need to be refreshed in case of a connection failure.

Similarly, in another example, a connection handler 1 adapted for maintaining internal connection pools 30, 31 for MQ messages (see above) may comprise a connection group with the properties MQ server address, port, queue manager name and connection channel. Consequently, a pool refresh would affect all connection objects 300, 301 having the same values of the above properties, even if e.g. the queue name or other further connection properties are different.

In summary, the feature of connection groups has the advantage of efficiently controlling the life cycle management activities of the connection handler 1 such as pool refresh, connection expiry, controlling the minimum and maximum number of connection objects, etc. based on connection property values.

The connection handler 1 of the present invention may further have the capability to predefine a subset of connection parameters using aliases. This is especially advantageous if parts of the connection properties are already known at the time the connection handler 1 is configured. Then, during runtime, an application 2 may request a connection object 300, 301 based on the value of certain dynamic properties, as will be explained in more detail in the following.

In the following example (see also the exemplary application scenario further above), an application 2 intends to post data for the users to corresponding tables of a user database. The application 2 may require connections to each of the user databases. In this example, there is a fixed, predefined number of users which all use different databases.

An approach known in the prior art would be to configure a distinct connection pool for each user within the application 2. The application 2 would then have to identify during runtime which connection pool to use, e.g. based on a mapping between users and connection pools. However, this is obviously labour-intensive and error-prone and considerably increases the overhead of administrative tasks that needs to be performed by the application 2.

On the contrary, if the application 2 employs one embodiment of the inventive connection handler 1, one or more aliases may be defined, preferably during configuration time, within the connection handler 1, wherein each alias is a definition of a set of connection properties and/or corresponding values. In the above presented exemplary scenario, one of the connection properties within an alias may be an ID of the corresponding user, a database server address, a database name, a username and/or a password, preferably specific for each individual user. It is noted that the further connection handler configuration properties already described further above (e.g. the maximum/minimum number of allowed connections, expiry time, etc.) may be the same for all aliases and therefore defined globally within the connection handler 1.

During runtime, when the application 2 receives requests from the users, the application 2 uses only a single connection handler 1 by sending requests comprising an identification of a specifically configured connection object, e.g. by calling an operation getConnection(String aliasname) provided by the interface 10 of the connection handler 1. When doing so, the application 2 inserts the alias corresponding to the requesting user into the input parameter of the getConnection operation and the connection handler 1 can determine the corresponding connection properties from the alias definitions. In one embodiment, while defining the aliases, the alias name may be the user ID. During runtime, the application 2 may then call the operation getConnection (String aliasname), with the corresponding userid as the aliasname. Another way is to have userid as a property and specify the value while configuring aliases during design time. Then, the application 2 may use the operation getConnection(Map attributes) to obtain the connection object 300, 301 by passing the userid in the attributes.

In summary, the various features of the inventive connection handler 1 described above provide the advantage that the calling applications 2 need to be aware of only one single connection handler 1, and not of a plurality of different connection pools, as in the prior art, which leads to considerably less overhead within the applications 2 and thereby increases their performance. Moreover, it is a further advantage that the overall resource usage can be considerably optimized, since the configuration properties of the connection handler 1 (e.g. the maximum/minimum number of allowed connections) preferably apply to all internal connection pools and connection objects maintained by the entire connection handler 1, so that the connection handler 1 is able to manage the internal connection pools 30, 31 in a centralized manner.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a non-transitory computer readable storage medium or the like.

The invention claimed is:

1. A computing apparatus for providing at least one connection object to at least one application, the apparatus comprising:
 a processing system that includes at least one processor, the processing system configured to:
  maintain a plurality of heterogeneous internal connection pools, wherein each one of the plurality of heterogeneous internal connection pools has a configuration, wherein each one of the plurality of heterogeneous internal connection pools includes at least one connection object with a configuration that is unique for the respective heterogeneous internal connection pool;
  receive at least one request from the at least one application, the at least one request including an identification of a requested configuration;
  match the requested configuration to the configuration of a matched heterogeneous internal connection pool of the plurality of heterogeneous internal connection pools;
  store related pool information that identifies one or more related internal connection pools;
  refresh a first internal connection pool out of the plurality of heterogeneous internal connection pools;
  refresh, in dependence upon refresh of the first internal connection pool, at least one related internal connection pool based on the stored related pool information, the at least one related internal connection pool being different from the first internal connection pool; and provide the at least one application with a connection object from the matched heterogeneous internal connection pool in accordance with the received at least one request.

2. The apparatus of claim 1, wherein the processing system is further configured to:

create, during runtime, a new internal connection pool in accordance with the at least one request, depending on an evaluation of whether the plurality of heterogeneous internal connection pools already includes a respective internal connection pool; and keep the created internal connection pool after the at least one request has been processed.

3. The apparatus of claim 2, wherein the creation of the new internal connection pool further depends on an evaluation of the amount of connection objects currently in use in all existing internal connection pools and/or on an evaluation of the total amount of connection objects comprised in all existing internal connection pools.

4. The apparatus of claim 1, wherein the processing system is further configured to remove one or more of the existing connection objects from the one or more internal connection pools during runtime.

5. The apparatus of claim 4, wherein the removing of one or more of the existing connection objects comprises removing the least recently used, the most recently used, the least frequently used and/or the least frequently recently used connection object(s).

6. The apparatus of claim 4, wherein the removing of one or more of the existing connection objects depends on an evaluation of the total amount of connection objects comprised in all existing internal connection pools.

7. The apparatus of claim 3, wherein the evaluation comprises evaluating whether the total amount of connection objects comprised in all existing internal connection pools exceeds a predefined threshold defined during configuration of the connection handler.

8. The apparatus of claim 1, wherein the processing system is further configured to:

receive at least one second request from the at least one application, wherein the at least one second request does not comprise an identification of a configured connection object; and provide the at least one application with a connection object from a preconfigured internal connection pool.

9. The apparatus of claim 1, wherein the connection objects in each internal connection pool are configured with a set of connection properties and wherein the at least one request received includes a requested set of connection properties.

10. The apparatus of claim 1, wherein the connection objects in each internal connection pool are configured with a set of connection properties, wherein the processing system is further configured to store one or more aliases comprising a predefined set of connection properties, and wherein the at least one request includes one of the aliases.

11. The apparatus of claim 1, wherein each internal connection pool is configured with a set of connection properties comprising key/value pairs and wherein the information identifying one or more related internal connection pools comprises a subset of the keys.

12. A method executed on a computer system that includes at least one hardware processor, the method comprising:

storing, to memory that is coupled to the at least one hardware processor, a plurality of heterogeneous internal connection pools, wherein each one of the plurality of heterogeneous internal connection pools has a configuration, wherein each one of the plurality of heterogeneous internal connection pools includes at least one connection object with a configuration that is unique for the respective heterogeneous internal connection pool;

receiving at least one request from the at least one application, the at least one request including an identification of a requested configuration;

matching the requested configuration to the configuration of a matched heterogeneous internal connection pool of the plurality of heterogeneous internal connection pools;

storing related pool information that identifies one or more related internal connection pools;

refreshing a first internal connection pool out of the plurality of heterogeneous internal connection pools;

refreshing, as a result of determining that the first internal connection pool has been refreshed, at least one related internal connection pool based on the stored related pool information, the at least one related internal connection pool being different from the first internal connection pool; and providing the at least one application with a connection object from the matched heterogeneous internal connection pool in accordance with the received at least one request.

13. A non-transitory computer readable storage medium storing computer readable instructions for use with a computing system that includes at least one process, the stored instructions comprising instructions configured to:

maintain a plurality of heterogeneous internal connection pools, wherein each one of the plurality of heterogeneous internal connection pools has a configuration, wherein each one of the plurality of heterogeneous internal connection pools includes at least one connection object with a configuration that is unique for the respective heterogeneous internal connection pool;

receive at least one request from an application, the at least one request including an identification of a requested connection object configuration;

match the requested connection object configuration to the configuration of a matched heterogeneous internal connection pool of the plurality of heterogeneous internal connection pools;

store related pool information that identifies one or more related internal connection pools for the plurality of heterogeneous internal connection pools;

refresh a first internal connection pool out of the plurality of heterogeneous internal connection pools;

refresh, in dependence upon refresh of the first internal connection pool, at least one related internal connection pool(s) that are related to the first internal connection pool based on the stored related pool information, the at least one related internal connection pool(s) being separate from the first internal connection pool; and provide the at least one application with a connection object from the matched heterogeneous internal connection pool in accordance with the received at least one request.

* * * * *